(12) United States Patent
Gabriel

(10) Patent No.: US 11,357,355 B2
(45) Date of Patent: Jun. 14, 2022

(54) COOKING AID WITH A FLOATABLE, HERMETICALLY SEALED BODY

(71) Applicant: BRAINSTREAM GMBH, Oerlinghausen (DE)

(72) Inventor: Rupprecht Gabriel, Oerlinghausen (DE)

(73) Assignee: BRAINSTREAM GMBH, Oerlinghausen (DE)

( * ) Notice: Subject to any disclaimer, the term of this patent is extended or adjusted under 35 U.S.C. 154(b) by 277 days.

(21) Appl. No.: 16/330,828

(22) PCT Filed: Sep. 11, 2017

(86) PCT No.: PCT/IB2017/055471
§ 371 (c)(1),
(2) Date: Aug. 9, 2019

(87) PCT Pub. No.: WO2018/047133
PCT Pub. Date: Mar. 15, 2018

(65) Prior Publication Data
US 2019/0365148 A1    Dec. 5, 2019

(30) Foreign Application Priority Data

Sep. 9, 2016 (DE) .................. 10 2016 117 027.5

(51) Int. Cl.
*G01K 1/143* (2021.01)
*A47J 27/62* (2006.01)
(Continued)

(52) U.S. Cl.
CPC .............. *A47J 36/321* (2018.08); *A23L 5/15* (2016.08); *A47J 27/004* (2013.01); *A47J 27/62* (2013.01);
(Continued)

(58) Field of Classification Search
CPC ........ A47J 27/00; A47J 27/002; A47J 27/004; A47J 27/62; A47J 36/00; A47J 44/00;
(Continued)

(56) References Cited

U.S. PATENT DOCUMENTS 4,503,563 A * 3/1985 Johnson .................... F21S 9/02
362/158
5,681,110 A * 10/1997 Burzacchi ................ G01K 1/06
374/142
(Continued)

FOREIGN PATENT DOCUMENTS

| DE | 29910556 U1 | 10/1999 |
|---|---|---|
| EP | 0441432 A1 | 8/1991 |
| EP | 2941986 A1 | 11/2015 |

OTHER PUBLICATIONS

International Search Report dated May 11, 2018 distributed by the European Patent Office; Authorized Officer: Marcos Moreno Rey.

*Primary Examiner* — Reginald Alexander
(74) *Attorney, Agent, or Firm* — Greenberg Traurig LLP

(57) ABSTRACT

An electronic device and a system are to be provided in order to allow, at any time, monitoring of a cooking state (as a system state) of a product cooked preferably in a liquid. This is achieved by means of a hermetically sealed body with an electronic arrangement accommodated in the body. The arrangement comprises an electronic assembly (10) with a model-forming arithmetic unit (11) and a temperature sensor (20) adapted and arranged to measure an ambient temperature of the body. In addition, an electric power source (30) and a radio interface (50) with an antenna (52) are provided, the model-forming arithmetic unit simulating a model of a cooking behavior of a foodstuff to be cooked. Information on the current cooking state of the foodstuff is
(Continued)

transmitted from the transmission unit (52) to a receiver (a smart device) spaced apart from the hermetically sealed body.

14 Claims, 2 Drawing Sheets

(51) Int. Cl.
| | |
|---|---|
| *A47J 36/32* | (2006.01) |
| *A23L 5/10* | (2016.01) |
| *A47J 27/00* | (2006.01) |
| *A47J 29/02* | (2006.01) |
| *F24C 7/00* | (2006.01) |
| *F24C 7/08* | (2006.01) |
| *G01K 1/024* | (2021.01) |
| *G09B 19/00* | (2006.01) |
| *G01K 1/08* | (2021.01) |
| *A47J 36/00* | (2006.01) |

(52) U.S. Cl.
CPC .............. *A47J 29/02* (2013.01); *F24C 7/006* (2013.01); *F24C 7/08* (2013.01); *G01K 1/024* (2013.01); *G01K 1/143* (2013.01); *G09B 19/0092* (2013.01); *A47J 36/00* (2013.01); *G01K 1/08* (2013.01); *G01K 2207/06* (2013.01)

(58) Field of Classification Search
CPC ... A47J 45/068; A47J 43/287; G09B 19/0092; G01K 1/08; G01K 1/143
USPC ......... 99/325, 326, 327, 328, 331, 332, 333, 99/334; 374/208
See application file for complete search history.

(56) References Cited

U.S. PATENT DOCUMENTS

| | | | |
|---|---|---|---|
| 5,699,721 A * | 12/1997 | Funke | A47J 29/02 99/336 |
| 6,591,738 B2 * | 7/2003 | Gabriel | G01K 3/04 374/E3.004 |
| 2009/0096617 A1 | 4/2009 | Purcell | |
| 2014/0009280 A1 | 1/2014 | Takahashi et al. | |
| 2016/0069853 A1 | 3/2016 | Mitchell | |
| 2016/0198885 A1 * | 7/2016 | Logan | A47J 36/00 99/325 |

* cited by examiner

COOKING AID WITH A FLOATABLE, HERMETICALLY SEALED BODY

BACKGROUND OF THE INVENTION

1. Field of the Invention

The present disclosure (and claims) relate to a preferably floatable, hermetically sealed body with an (electronic) arrangement accommodated in the floatable, hermetically sealed body. The arrangement comprises an electronic assembly with a model-forming arithmetic unit, a temperature sensor adapted and arranged to measure an ambient temperature of the floatable, hermetically sealed body, an electric power source and a radio interface with an antenna.

The model-forming arithmetic unit simulates a model of a cooking behavior (also thermal behavior) of a product to be cooked, e.g. a foodstuff to be cooked. A center of gravity of the preferably floatable, hermetically sealed body with the arrangement is selected and arranged such that, when the body floats in a fluid volume immersed to a certain extent, the antenna will be located above a fluid line or a fluid surface. Information on the current cooking state of the product and/or data for adapting the model to products with different cooking points can be transmitted by the radio interface to a receiver spaced apart from the floatable, hermetically sealed body. The present invention additionally relates to a system comprising the floatable, hermetically sealed body and a smart device for monitoring and reporting the cooking time or times of a product.

2. Description of the Related Art

Today's ovens have cooking programs that can be used to cook respective dishes more or less to the point. For cooking in water, only the cooking time is usually monitored, with experience being used to adapt the cooking time to the size of the product and the cooking state being checked with an aid, such as a fork, when the cooking point has been reached. Especially products whose degree of cooking or cooking point cannot be checked sensorily during cooking, such as eggs, require complex setting for computing the cooking time, if the latter is determined by means of the so-called timer method.

Hence, there is a need for a device and/or a system allowing a cooking point of products to be cooked in liquids, such as water, to be precisely determined to the greatest possible extent at any time.

BRIEF SUMMARY OF THE INVENTION

It is an object of the present invention(s) to provide an electronic device and a system by means of which a state of cooking of a product preferably cooked in liquid can be monitored at any time.

An embodiment relates to a preferably floatable, hermetically sealed body with an arrangement accommodated in the body, the arrangement comprising an electronic assembly with a model-forming arithmetic unit, a temperature sensor adapted and arranged to measure an ambient temperature of the body, an electric power source, a radio interface with an antenna, the model-forming arithmetic unit simulating a model of a cooking behavior of a product to be cooked, in particular of a foodstuff to be cooked.

A center of gravity of the preferably floatable, hermetically sealed body including the arrangement may be selected and arranged such that, when the body floats in a fluid volume immersed to a certain extent, the antenna will be located above a fluid line or a fluid surface. Information on the current cooking state of the product is transmitted via the radio interface, in particular to a receiver spaced apart from the floatable, hermetically sealed body.

A second embodiment relates to a floatable, hermetically sealed body with an arrangement accommodated in the body, the arrangement comprising an electronic assembly with a model-forming arithmetic unit, a temperature sensor adapted and arranged to measure an ambient temperature of the body, an electric power source, a radio interface with an antenna, the model-forming arithmetic unit simulating a model of a cooking behavior of a product to be cooked, in particular of a foodstuff to be cooked. A center of gravity of the floatable, hermetically sealed body with the arrangement is selected and arranged such that, when the body floats in a fluid volume immersed to a certain extent, the antenna will be located above a fluid line or a fluid surface. Information on the current cooking state of the product is preferably cyclically transmitted by the radio interface to an internal memory of the electronic assembly, and the values transmitted last from the receiving unit update the values stored in the memory.

Information on the current cooking state of the product is transmittable by the radio interface to a receiver, such as a smart device, which is preferably spaced apart from the floatable, hermetically sealed body.

A third embodiment relates to a floatable, hermetically sealed body with an arrangement accommodated in the floatable, hermetically sealed body. The arrangement comprises an electronic assembly with a model-forming arithmetic unit, a temperature sensor adapted and arranged to measure an ambient temperature of the floatable, hermetically sealed body, an electric power source and a radio interface with an antenna. The model-forming arithmetic unit simulates a model of a cooking behavior of a product to be cooked, in particular of a foodstuff to be cooked. A center of gravity of the floatable, hermetically sealed body with the arrangement is selected and arranged such that, when the body floats in a fluid volume immersed to a certain extent, the antenna will be located above a fluid line or a fluid surface. Via the radio interface, at least one system program for the model-forming arithmetic unit can be received and transmitted to an internal working memory. Data of the model-forming arithmetic unit stored in the internal working memory are thus changed at least partially.

A fourth invention relates to a system for determining a cooking state of a product heated by means of a fluid. The system comprises a floatable, hermetically sealed body comprising at least one temperature sensor arranged in the floatable, hermetically sealed body and measuring the ambient temperature of the floatable, hermetically sealed body, an electric power source, an electronic component with an antenna for transmitting the temperature values measured by the at least one temperature sensor and/or the current cooking state of the product and/or a model value as a time unit depending on the current cooking state. The floatable, hermetically sealed body may additionally include an electronic assembly comprising a model-forming arithmetic unit and a sound generator, which outputs a signal when a desired cooking state of the product has been reached.

The system further comprises a smart device, e.g. a smartphone or a tablet, comprising a radio interface for receiving the signals transmitted from the electronic component of the floatable, hermetically sealed body, an electronic arithmetic unit with a memory having stored therein at least one cooking model for a product with at least one predetermined cooking point for the product, and a processor that compares the data received from the temperature sensor with the data of the stored cooking model as well as an output unit which outputs a signal perceptible by the user, when the at least one predetermined cooking point for the product has been reached.

A fifth aspect of the present invention relates to a system for determining a cooking state of a product to be cooked by means of a fluid. The system comprises a floatable, hermetically sealed body comprising at least one temperature sensor arranged in or on the body and measuring the ambient temperature of the body, an electronic assembly enclosed by the body and comprising a model-forming arithmetic unit with a memory having stored therein data for forming a model for at least one product, an electric power source enclosed by the body and a radio interface enclosed by the body and provided with an antenna.

Making use of the data stored in the memory, the model-forming arithmetic unit simulates a model of a cooking behavior of the at least one product. An external virtual memory (cloud) has stored therein data for models of the cooking behavior for numerous different products, the data being retrievable by means of a smart device from the external virtual memory and transmittable to the electronic assembly. The newly transmitted data received by the electronic assembly preferably overwrite the data stored in the memory of the model-forming arithmetic unit.

In the following, facultative features will be described, which are able to advantageously further develop each of the devices of the first, second and third aspects as well as the system according to the fourth or fifth aspect.

The system program for the model-forming arithmetic unit may in particular be a program that simulates the cooking characteristics of a product to be cooked. This means that the program comprises e.g. a thermal differential equation which simulates the cooking process. This differential equation can be processed by the model-forming arithmetic unit and it indicates, at any moment of cooking, the cooking state of the product for which it has been formulated. To this end, the temperature of the product and an ambient temperature of the product, respectively, as well as the temperature sensor, which is in signaling communication with the model-forming arithmetic unit and which measures the ambient temperature of the preferably floatable or floatable, hermetically sealed body, must be exposed to identical temperatures before cooking and during cooking. If the product in question is e.g. an egg, also the hermetically sealed body must be kept in a refrigerator together with the egg. The advantage here is that, independently of the density of the fluid (e.g. due to the air pressure at different altitudes), a result of cooking will always be the desired one, since the model and the hermetically sealed body, respectively, will always be exposed to the same environmental conditions as the product.

In the following, the term hermetically sealed body will be used in the sense of the floatable or non-floatable hermetically sealed body. The hermetically sealed body must be floatable, if the product is cooked in a fluid, e.g. water. If cooking takes place e.g. in a steam cooker, egg boiler or oven, etc., the hermetically sealed body need not necessarily be floatable. This means that the claims written with respect to the floatable body can also be read on non-floatable bodies, if the environment in which the hermetically sealed body is used is not a fluid, but e.g. a gas.

In order to detect the ambient temperature of the hermetically sealed body as precisely as possible, the temperature sensor may be connected directly to an inner side of a preferably thermally conductive outer shell of the hermetically sealed body or it may be integrated in the outer shell.

The antenna may be a component part of the electronic assembly. It may e.g. be a flat metallic body, preferably a piezoelectric element. Preferably, the antenna is arranged in the hermetically sealed body such that, when the hermetically sealed body floats in a weight- and dimensionally-stable manner, the antenna will always be located above the fluid line or fluid surface and a ground coupling point will capacitively have a lower coupling capacitance to the surroundings than the antenna for emitting the radio waves.

The system program for the model-forming arithmetic unit can especially simulate the cooking characteristics of a foodstuff. The foodstuff may e.g. be pasta having, depending on its shape (spaghetti, cannelloni, elbow pasta, etc.) and ingredients (durum wheat semolina, flour, wholemeal flour, gluten-free, with or without egg, etc.), different cooking times for obtaining e.g. the cooking degree "al dente" or "soft-boiled". Other examples are vegetables or eggs that have different sizes (quail, chicken, ostrich) and can be "organic" or "non-organic".

The radio interface may be a transmitting unit, via which radio signals can be transmitted, or a receiving unit for receiving radio signals. Preferably, it is a bidirectional radio interface with which radio signals can be transmitted and received. This means that the radio interface may be configured as a combined bidirectional radio unit, in particular a high-frequency radio unit. In the system, both the hermetically sealed body and the smart device may each comprise a bidirectional interface or a combined high-frequency bidirectional radio unit, so that each of the two can receive radio signals from the other and transmit radio signals to the other. This means that a cooking state of the product determined by the model-forming arithmetic unit of the hermetically sealed body can be output and e.g. read at the spaced-apart receiver, e.g. the smart device.

The bidirectional radio unit has a damping of less than 30 dB for radio frequencies in a frequency range of 1 GHz to 6 GHz.

The hermetically sealed body may comprise a sound generator, which may be a component part of the electronic assembly. The sound generator may transmit an audible signal, when the product has reached the desired cooking state. In particular, the signal may be a melody or some other sequence of tones that can preferably be selected by the user. Alternatively, the sound generator may also have a recording function, so that the user himself can determine the signal emitted when the desired cooking state has been reached. In the case of products having a plurality of different cooking points, such as an egg (semi-solid egg white, liquid egg yolk, creamy egg yolk, hard-boiled), a plurality of distinguishable signals or melodies can indicate the respective cooking state accomplished. All the cooking states may here always be signaled one after the other, or the cooking state at which a signal will sound may be selected by the user e.g. by means of a voice command, via a pressure sensor in the outer shell of the hermetically sealed body or by selection by means of the smart device, etc.

The sound generator may comprise the antenna or define in a dual function the antenna of the electronic assembly.

The electric power source may be a battery or an induction rechargeable accumulator. If it is a battery, a lithium primary cell is preferably used, which normally has a long service life and is suitable for slow discharge and which operates reliably at high temperatures. In order to prevent the power source from being damaged or destroyed even in hot surroundings during cooking, the electric power source is sealed in a pressure-tight manner within the hermetically sealed body, so as to withstand a pressure of at least 1.3 hPa. The pressure-tight or pressure-resistant sealing material used may e.g. be a synthetic resin, which encases the power source.

The model-forming arithmetic unit can have transmitted thereto parameters and programs from a spaced-apart smart device or from some other transmitting unit. This means that e.g. the temperature data measured by the temperature sensor can be transmitted or that programs from outside the hermetically sealed body can be sent to the model-forming arithmetic unit.

The bidirectional radio unit may be a standardized radio unit, in particular a radio unit according to the Bluetooth standard. Especially in the systems according to the fourth and fifth aspects, both the hermetically sealed body as well as the smart device each comprise a preferably bidirectional radio unit so that they can communicate with each other.

In order to extend the service life of the power source as long as possible, in particular if the power source used is the lithium primary cell, the bidirectional radio unit and/or the model-forming arithmetic unit can switch to a low-power mode, if they are not active for a predetermined period of e.g. a few seconds. Switching to the low-power mode is preferably automatic. In the low-power mode, power consumption decreases to a value of less than 5 µA, preferably to a value of less than 1 µA. For a first connection and for an exchange of data between the model-forming arithmetic unit and the smart device, the sound generator of the hermetically sealed body may e.g. be used for waking up the bidirectional radio unit and/or the model-forming arithmetic unit from the low-power mode.

The smart device may be a smartphone. The smartphone may have stored thereon an app that provides programs for simulating the cooking behavior of at least one product, preferably of numerous different products. The app preferably has a surface that is capable of displaying, in the form of an image and/or in written form, signals received from the bidirectional radio unit of the hermetically sealed body.

The app may comprise a further model-forming arithmetic unit, which, when the app is open, can be activated or downloaded to the smart device and activated there. With the programs of the app and the data of e.g. the temperature sensor, this further model-forming arithmetic unit can supplement or take over the function of the model-forming arithmetic unit of the hermetically sealed body. This means, for example, that model formation can take place in parallel in the model-forming arithmetic unit and in the further model-forming arithmetic unit. If a bidirectional radio link exists, the cooking process will be primarily simulated by the further model-forming arithmetic unit of the smart device. If the bidirectional radio link is interrupted, e.g. because the smart device is moved away too far from the cooking vessel, the model-forming arithmetic unit of the hermetically sealed body will take over model formation. If the bidirectional radio link is now re-established by moving the smart device closer to the cooking vessel, model formation will again be taken over by the further model-forming arithmetic unit of the smart device. When the cooking point has been reached, the sound generator of the hermetically sealed body and/or of the smart device can output the respective signal.

The hermetically sealed body of the system may comprise an electronic assembly without a model-forming arithmetic unit and without a sound generator. In this case, the formation of a model of the product being cooked is executed by the further model-forming arithmetic unit of the app on the smart device. For allowing the model to be formed, the radio interface of the hermetically sealed body, which need not be configured as a bidirectional radio interface in this case, transmits the data measured by the temperature sensor to the smart device. Making use of these received data and of the programs for the product cooking behavior provided by the app, the further model-forming arithmetic unit of the app can then form the respective model. In this case, the information indicating that the cooking point has been reached will be output via the sound generator of the smart device.

Since assemblies that come into contact with food have to satisfy high demands as regards safety and the materials used, the power source can normally not be replaced. Therefore, the use of a multiple encapsulated power source (e.g. a button cell) should allow operation for several years. Hence, it will be consistent with the aim of the present invention when the communication load is limited to a minimum, so as to spare the power source. A model-forming arithmetic unit according to the prior art actually needs less than 3 µA, when the computing process is carried out by the model-forming arithmetic unit of the hermetically sealed body. A communication setup with the smart device will, however, consume 10 mA to 40 mA, i.e. the power consumption will be more than a thousand times higher. Therefore, it will be advantageous when communication between the smart device and the hermetically sealed body will only be established, if new data and/or parameters have to be transmitted or exchanged, e.g. because some other product is to be cooked or the signal is to be output at a different cooking state. According to the present invention, the device (hermetically sealed body) or the system can be operated more reliably with a battery with a charge of 200 mAh over a period of at least 10 years.

The model-forming arithmetic unit can preferably compute more than one model at a time. This allows to compute the cooking degree during a cooking process in one pot for different tastes (e.g. egg yolk liquid, egg yolk creamy) and sizes of the food to be cooked (e.g. eggs of sizes M and XL in one pot) and, as has already been described above, it allows to indicate the respective cooking state of the product in question with different melodies or announcements.

It is important to realize for the hermetically sealed body a mechanical structure that complies with the regulations for food contact. This is achieved by installing the electronics inside a hollow body that is welded in a leakproof manner by a thermal process, laser or ultrasound. The temperature sensor is arranged closely below the outer shell, preferably on an inner side of the outer shell of the hollow body, and is able to measure the ambient temperature with high precision through the outer shell that preferably has good thermal conduction. In the case of a floatable hollow body, the sound generator is preferably located above the fluid level surrounding the floating hollow body and can serve as an antenna, as has already been described.

The hermetically sealed hollow body can have arranged therein the model-forming arithmetic unit, the temperature sensor, a radio interface and, optionally, an electrodynamic or piezo sound generator, which is preferably firmly connected (e.g. glued or welded) to the outer shell of the hollow body. The hollow body is, in particular, floatable and may optionally be enclosed in a design-creating open form at least in an area that does not cover the temperature sensor.

Since hollow bodies made of plastic may be permeable to water vapour, the electronics may be potted in a plastic foam for protection. Closed-pore hard plastic materials are here particularly suitable for increasing the buoyancy of the hermetically sealed body.

A sixth invention is a method of identifying, detecting or determining a specific thermal state (called "cooking point"), at which a cooking state sensor (hermetically sealed body) is removed from a store (e.g. refrigerator) together with a product to be cooked. The cooking state sensor and the product are placed together in a cooking appliance (pot with water, steam cooker, oven, etc.). The cooking state sensor comprises a model-forming arithmetic unit and a temperature sensor and simulates the cooking progress of the product. When a desired cooking state has been reached, the cooking state sensor outputs an audible and/or visible signal.

Optionally, the cooking state sensor may be connectable to a smart device, and the program or parameters for the cooking state sensor and/or information on the cooking progress of the product can be exchanged via a suitable radio link between the smart device and the cooking state sensor.

A further aspect concerns a method in the case of which the model-forming program runs only on the smart device, and the cooking state sensor, which need not comprise an electronic assembly with a model-forming arithmetic unit in this case, transmits the parameters measured by the temperature sensor to the smart device, where they are used to determine the cooking progress of the product.

BRIEF DESCRIPTION OF THE DRAWINGS

The embodiments of the present invention are shown on the basis of an example or examples and not in a manner in which limitations from the figures are transferred to or read into the claims. Like reference numerals in the figures designate like elements.

DETAILED DESCRIPTION OF PREFERRED EMBODIMENTS

Figure 1:
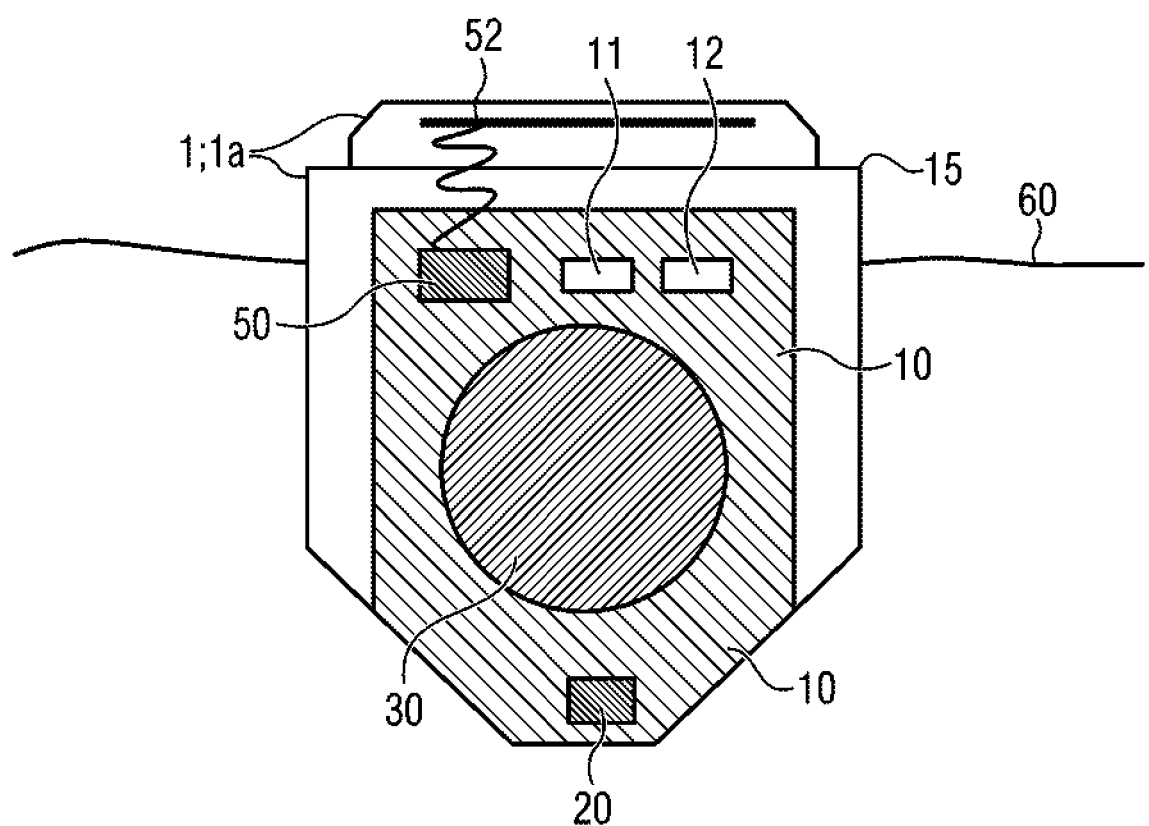
FIG. 1 shows a floatable, hermetically sealed body, immersed in a fluid.

FIG. 1 shows an embodiment of a cooking state sensor according to the present invention. The cooking state sensor is a floatable, hermetically sealed body 1, 1a that floats in a fluid, such as water. The floatable, hermetically sealed body 1, 1a is partially immersed in the fluid and has a center of gravity that ensures a clear and stable position in the liquid environment.

The floatable, hermetically sealed body 1, 1a comprises an electronic assembly 10, an electric power source 30, a temperature sensor 20, a radio interface 50 and an antenna 52. The antenna 52 is arranged within the floatable, hermetically sealed body 1, 1a such that it will always be located above the fluid line 60, so as to guarantee a reliable transmission of data to and from the floatable, hermetically sealed body 1, 1a.

The antenna 52 may advantageously also constitute a sound generator that outputs e.g. audible signals, when a predetermined cooking point of a product, which is not shown and which is heated and cooked together with the cooking state sensor in the fluid, has been reached. For products having a plurality of possible cooking points, such as an egg (egg white not yet solid, egg white solid but egg yolk liquid, egg yolk creamy, egg yolk hard), a signal can be output at each of these cooking points. The signal may e.g. be a melody, and in the case of the egg a different melody may be played for each cooking point reached.

The electronic assembly 10 comprises a model-forming arithmetic unit 11 and an internal memory 12. By means of a differential equation stored in the model-forming arithmetic unit 11 or the internal memory 12, the model-forming arithmetic unit 11 is able to simulate a model of at least one product to be cooked. If the model-forming arithmetic unit 11 is configured for simulating models of different products (eggs of different sizes, noodles, vegetables, etc.), the user may, for example, enter the desired product by voice control via the sound generator, which in this case is also used as a microphone. For confirming that the correct cooking program has been set, the selected product can be confirmed by naming via the sound generator. For forming the model, the differential equation is supplemented at least by the data measured by the temperature sensor 20, since the cooking process is directly dependent on the temperature of the fluid in which cooking takes place.

It will therefore be advantageous when the temperature sensor 20 is arranged as directly as possible on an inner side of the outer shell 15 of the cooking state sensor, so as to be able to precisely measure the temperature of the floatable, hermetically sealed body 1, 1a at any time and without delay. The temperature sensor can measure the ambient temperature continuously and transmit the measurement results continuously to the model-forming arithmetic unit 11. The measurement and/or the transmission may, however, also be clocked. The closer the measured temperature approaches the target temperature or the target cooking point of the product, the shorter an interval between two successive measurements and/or transmissions will be. The variations of the time interval between two successive measurements of the temperature sensor 20 can be controlled by the model-forming arithmetic unit 11 in that the latter queries the data and the temperature sensor 20 does not actively transmit its measurement data to the model-forming arithmetic unit 11.

Figure 2:
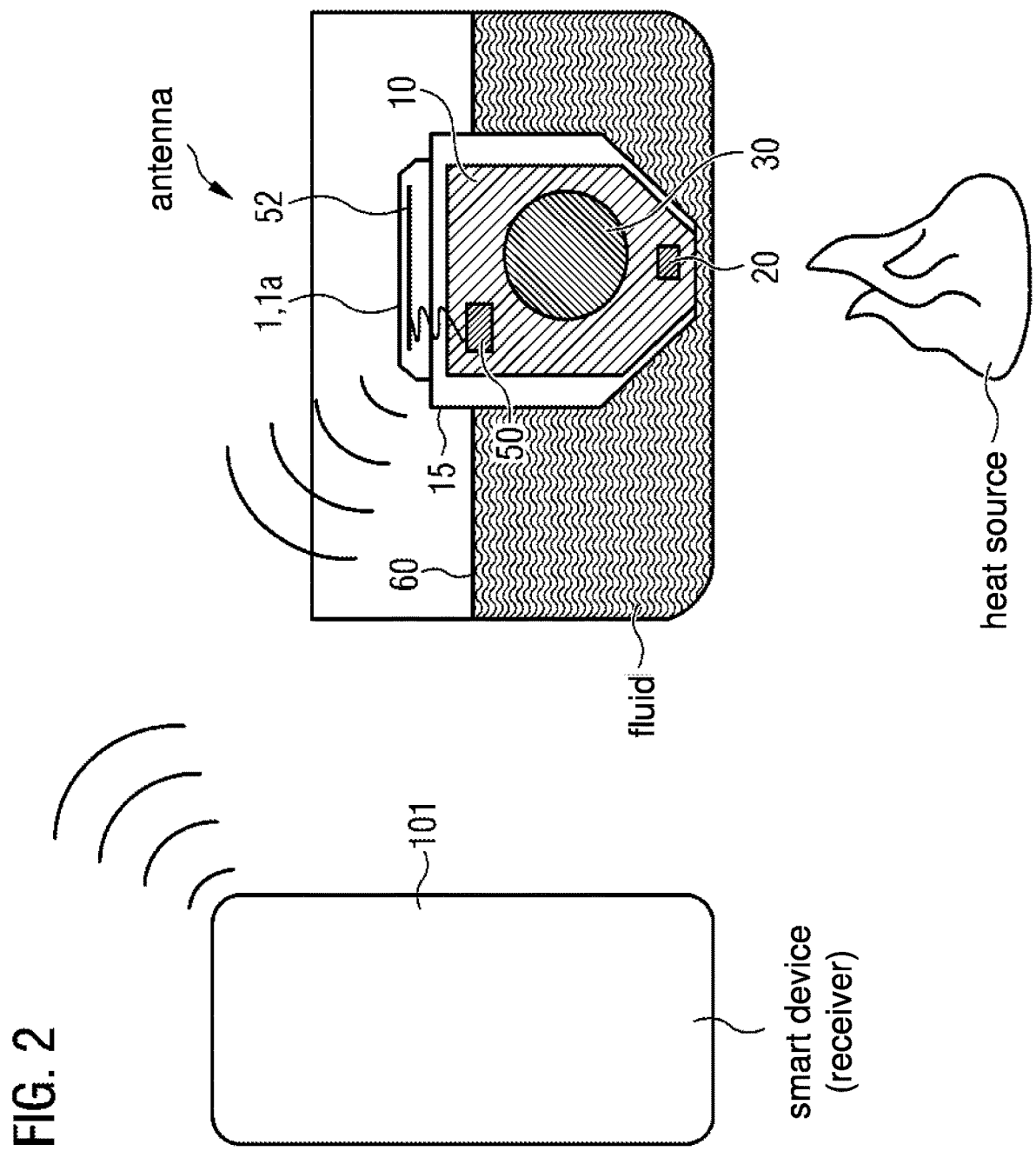
FIG. 2 shows a system consisting of a smart device (device with touch-sensitive display) and of the hermetically sealed body according to FIG. 1.

FIG. 2 shows a cooking state sensor according to FIG. 1 in a pot, the product to be cooked, which is also in the pot, being not shown. Below the pot, a flame symbol can be seen, which illustrates the input of heat into the pot and the fluid contained in the pot, respectively. A smart device 101, e.g. a smartphone or a tablet, is shown at a distance from the cooking state sensor floating in the fluid.

The radio waves at the smart device 101 and at the floatable, hermetically sealed body 1, 1a indicate that the two devices can be connected to and communicate with each other, e.g. by means of the Bluetooth standard, i.e. they can exchange data and/or programs. For example, the smart device 101 can download from an app programs for forming cooking models of numerous products and forward them to the electronic component 10 via a bidirectional radio link. Alternatively, the app may also comprise a further model-forming arithmetic unit that can be used on the smart device 101.

In order to spare the electric power source 30, model formation can take place in the smart device 101. The data of the temperature sensor 20 must be transmitted from the cooking state sensor to the smart device 101 so as to allow model formation. Also the output of the signal or the signals when the desired product cooking point has been reached can be effected via a sound generator of the smart device 101 so as to spare the electric power source 30.

In the system consisting of the smart device and the cooking state sensor, the use of the model-forming arithmetic unit 11 in the floatable, hermetically sealed body 1, 1a may also be dispensed with, which can have an advantageous effect on the manufacturing costs. In this case it must, however, be guaranteed that the radio link between the cooking state sensor and the smart device 101 will not be interrupted or at least reestablished in time, before the desired cooking point of the product is reached.

If the cooking state sensor comprises the model-forming arithmetic unit 11 and the smart device 101 the further model-forming arithmetic unit, the formation of models can take place primarily on the smart device 101. If the radio link is interrupted, the model-forming arithmetic unit in the floatable, hermetically sealed body 1, 1a can take over the formation of models.

What is claimed is:

1. A floatable, hermetically sealed body with an electronic arrangement accommodated therein comprising:
    an electronic assembly (10) with a model-forming arithmetic unit (11);
    a temperature sensor (20) adapted and arranged to measure an ambient temperature of the floatable, hermetically sealed body;
    an electric power source (30) and a receiving unit or a radio interface (50) with an antenna (52);
    wherein the model-forming arithmetic unit simulates a model of a cooking behavior of a foodstuff to be cooked;
    wherein the foodstuff, the temperature sensor, and the floatable, hermetically sealed body are exposed to substantially identical temperatures before cooking and during cooking so that the model-forming arithmetic unit and the floatable, hermetically sealed body are always exposed to substantially the same environmental conditions as the foodstuff,
    a center of gravity of the floatable, hermetically sealed body (1, 1a) with the arrangement is selected and arranged such that, when the floatable, hermetically sealed body floats in a fluid volume immersed to a certain extent, the antenna (52) will be located above a fluid line or a fluid surface;
    and wherein information on a current cooking state of the foodstuff is cyclically transmittable from the receiving unit to an internal memory (12) of the electronic assembly (10) and values transmitted last from the receiving unit update the respective values stored in the internal memory (12),
    or
    information on the current cooking state of the foodstuff is transmitted by the radio interface (50) to a receiver, spaced apart from the floatable, hermetically sealed body,
    wherein the electric power source is a battery or an induction rechargeable accumulator with a long service life, suitable for slow discharge, and reliably operating at high temperatures,
    wherein the electric power source is positioned inside the floatable, hermetically sealed body, and sealed with a pressure-tight or pressure-resistant sealing material withstanding an overpressure of at least 1.3 hPa.

2. The floatable, hermetically sealed body according to claim 1, wherein information transmitted by the radio interface (50) and concerning a cooking state of the foodstuff is adapted to be outputted at the spaced-apart receiver or at a smart device.

3. The floatable, hermetically sealed body according to claim 1, wherein the radio interface (50) comprises a bidirectional high-frequency radio unit has a damping of less than 30 dB preferably for radio frequencies in a frequency range of 1 GHz to 6 GHz.

4. The floatable, hermetically sealed body according to claim 1, wherein the electronic assembly (10) comprises a sound generator.

5. The floatable, hermetically sealed body according to claim 1, wherein the antenna (52) is a component part of the electronic assembly and the antenna comprises a piezoelectric element.

6. The floatable, hermetically sealed body according to claim 4, wherein the sound generator comprises or forms the antenna (52).

7. The floatable, hermetically sealed body according to claim 1, wherein the electric power source (30) is a lithium primary cell.

8. The floatable, hermetically sealed body according to claim 1, wherein parameters and programs are transmittable via a bidirectional radio unit to the model-forming arithmetic unit (11) or a further model-forming arithmetic unit, and the bidirectional radio unit is a radio unit according to the Bluetooth standard.

9. The floatable, hermetically sealed body according to claim 1, wherein the radio interface is a bidirectional high-frequency radio unit, and the bidirectional high-frequency radio unit and/or the model-forming arithmetic unit (11) are, after a predetermined period of non-activity, automatically transferrable to a low-power mode with a power consumption of less than 5 μA, and wherein, for a first connection and for an exchange of data between the model-forming arithmetic unit (11) and a spaced apart receiver a sound generator is used for waking up the bidirectional high-frequency radio unit and/or the model-forming arithmetic unit (11) from the low-power mode.

10. The floatable, hermetically sealed body according to claim 1, wherein the spaced-apart receiver is a smartphone and the smartphone has stored thereon an app that provides programs for simulating a cooking behaviour of the foodstuff, and a surface that displays signals received from the radio interface.

11. The floatable, hermetically sealed body according to claim 10, wherein the app comprises a further model-forming arithmetic unit and the model-forming arithmetic unit of the hermetically sealed body and/or the further model-forming arithmetic unit on the smartphone simulates the model of the cooking behavior of the foodstuff to be cooked.

12. The floatable, hermetically sealed body according to claim 11, wherein, there is a bidirectional radio link between the floatable, hermetically sealed body and the smartphone, and model computing will be executed by the further model-forming arithmetic unit on the smartphone, and, if the bidirectional radio link is interrupted, it will be executed by the model-forming arithmetic unit of the floatable, hermetically sealed body.

13. The floatable, hermetically sealed body according to claim 10, wherein the foodstuff comprises a selection of different foodstuffs.

14. A system for detecting or determining a cooking state of a product that is heatable in a fluid, the system comprising:
    a floatable, hermetically sealed body comprising:
        at least one temperature sensor (20) accommodated in the floatable, hermetically sealed body (1, 1a) and adapted and arranged to measure an ambient temperature of the floatable, hermetically sealed body (1, 1a);
        an electric power source (30);
        a first sound generator; and an electronic component with a transmission unit or a radio interface (50) with an antenna (52) for transmitting the ambient temperature measured by the at least one temperature sensor (20) and an electronic assembly with a model-forming arithmetic unit (11);
wherein the radio interface is a bidirectional radio unit, and
wherein a center of gravity of the floatable, hermetically sealed body (1, 1a) is selected and arranged such that, when the floatable, hermetically sealed body floats in a fluid volume immersed to a certain extent, the antenna (52) will be located above a fluid line or a fluid surface;

a smart device comprising:
  a radio interface for receiving signals transmitted from the electronic component and the electronic assembly of the floatable, hermetically sealed body (1, 1a);
  an electronic arithmetic unit with a memory having stored therein at least one model for a product with at least one predetermined cooking point for the product;
  a processor for comparing data received from the floatable, hermetically sealed body (1, 1a) with the at least one model stored in the memory; and
  a second sound generator to output a signal perceptible by a user, when the at least one predetermined cooking point has been reached, wherein the bidirectional radio unit or the model-forming arithmetic unit automatically switch to a low-power mode with a power consumption of less than 5 µA if they are not active for a predetermined period, and communication between the smart device and the floatable, hermetically sealed body is only established if data or parameters are transmitted or exchanged, wherein the first sound generator of the floatable, hermetical sealed body is used to wake up the bidirectional radio unit or the model-forming arithmetic unit from the low-power mode.

* * * * *